Figure 1:
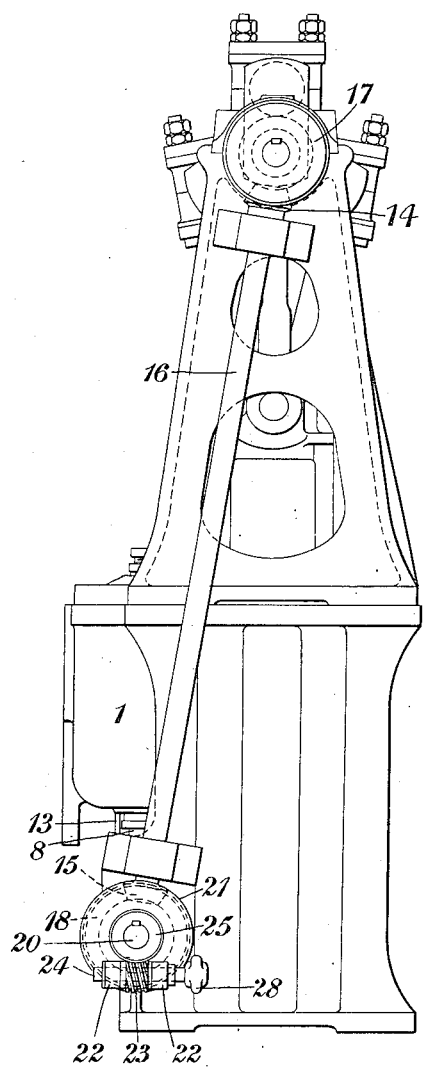

No. 861,213. PATENTED JULY 23, 1907.
T. H. C. HOMERSHAM.
PUMP.
APPLICATION FILED JAN. 27, 1906.

6 SHEETS—SHEET 3.

WITNESSES

INVENTOR
Thomas Henry Collett Homersham
BY
Howson and Howson
ATTORNEYS

No. 861,213. PATENTED JULY 23, 1907.
T. H. C. HOMERSHAM.
PUMP.
APPLICATION FILED JAN. 27, 1906.

6 SHEETS—SHEET 4.

WITNESSES
Paul A. Blair.
Walter Abby.

INVENTOR
Thomas Henry Collett Homersham
BY
Howson and Howson
ATTORNEYS

No. 861,213. PATENTED JULY 23, 1907.
T. H. C. HOMERSHAM.
PUMP.
APPLICATION FILED JAN. 27, 1906.

6 SHEETS—SHEET 5.

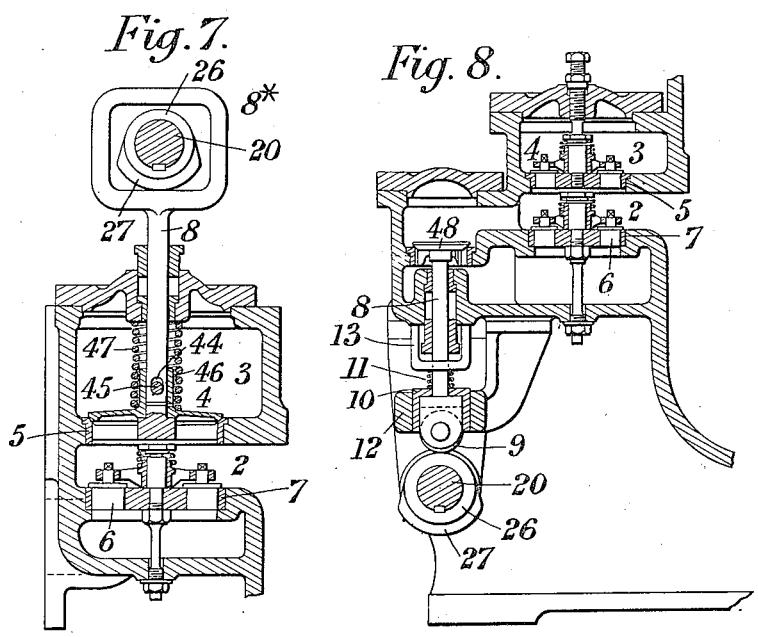

UNITED STATES PATENT OFFICE.

THOMAS H. C. HOMERSHAM, OF BRADFORD, ENGLAND, ASSIGNOR OF ONE-HALF TO THWAITES BROTHERS LIMITED, OF BRADFORD, ENGLAND.

PUMP.

No. 861,213.

Specification of Letters Patent.

Patented July 23, 1907.

Application filed January 27, 1906. Serial No. 298,244.

*To all whom it may concern:*

Be it known that I, THOMAS HENRY COLLETT HOMERSHAM, a subject of the King of Great Britain and Ireland, residing at Vulcan Iron Works, Thornton Road, Bradford, in the county of York, England, have invented new and useful Improvements in Pumps, of which the following is a specification.

The object of this invention is to provide pumps, (whether they be operated by electricity, steam, or other motive power), in which the quantity of fluid delivered is readily regulated without altering the speed of the pumps and without altering the length of stroke of the plungers, thus overcoming the formation of ridges on the plungers, due to short strokes, (or ridges in the cylinders in pumps wherein the plungers fit the cylinders), which ridges, when the stroke is lengthened, would cause damage to the packings. The objection of having to transmit power through gear designed to vary the length of stroke is also overcome.

According to this invention, the regulation of the quantity of fluid pumped is effected by rendering any required part of the stroke of the plungers ineffective for delivery, while the actual length of the stroke remains constant. This can be effected by the provision of means by which the suction, or delivery, valve, or valves, of the pump is, or are, held open during any part of the stroke, (or through the whole of the stroke when it is required to entirely stop delivery of fluid), such means not interfering with the opening and closing of the valves in delivering fluid as required. If the suction, or delivery, valve, or valves, of a pump be thus held open, the fluid drawn into the cylinder, or cylinders, will be circulated through the suction, or delivery, valve, or valves, when held open as aforesaid, and no work will be done, at the periods of the stroke when the valve is, or valves are, so held open, beyond that due to frictional resistance in the machine and to the circulation of fluid as aforesaid through the said valve, or valves.

Although the suction and delivery valves are mentioned, it will be obvious that a special valve, or special valves, can be employed, on either the suction, or delivery, side, instead of acting on the suction, or delivery, valves themselves.

I will describe, with reference to the accompanying drawings, arrangements in accordance with this invention illustrating how it can be performed, but I do not limit myself to the precise details illustrated and hereinafter described.

Figure 2:
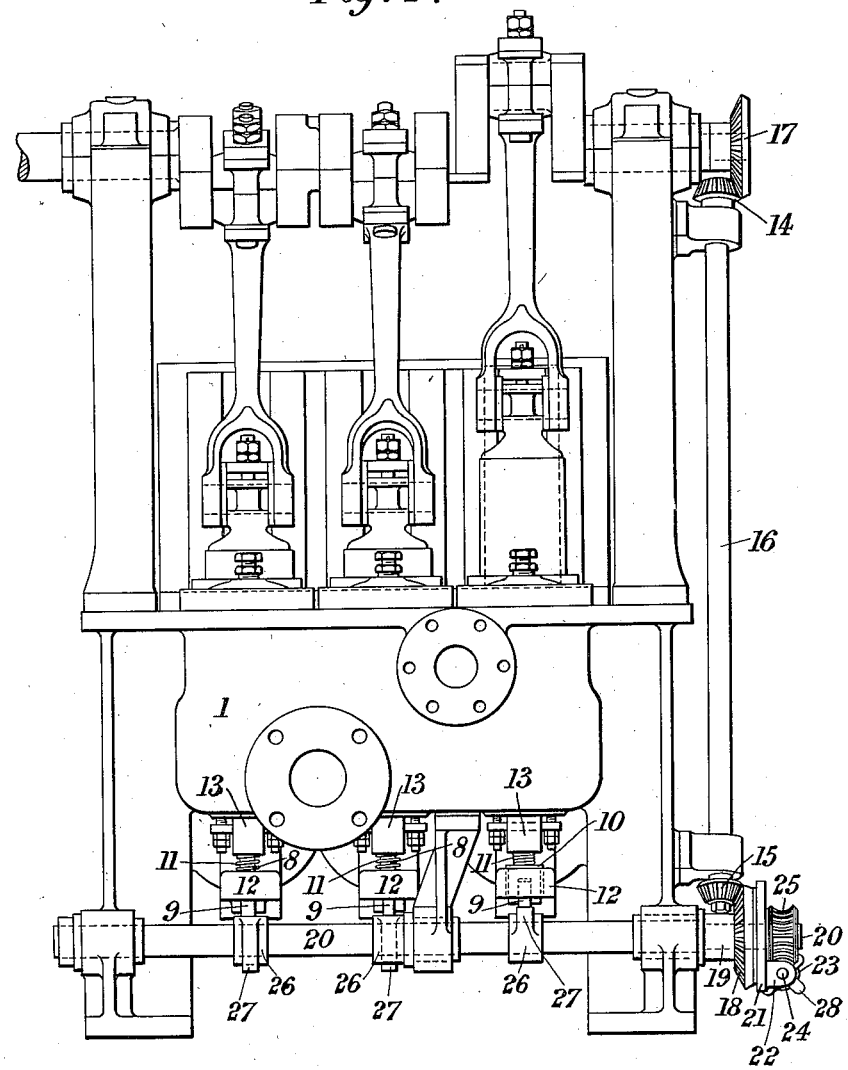
Figure 3:
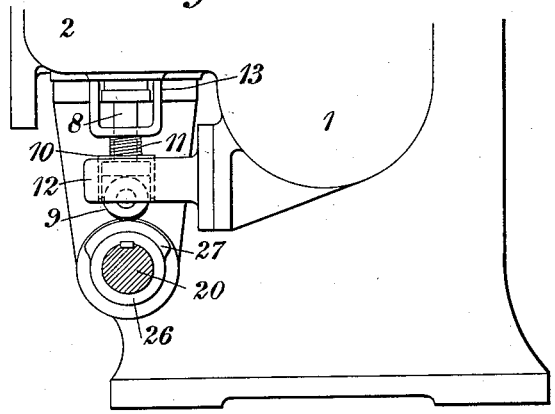
Figure 4:
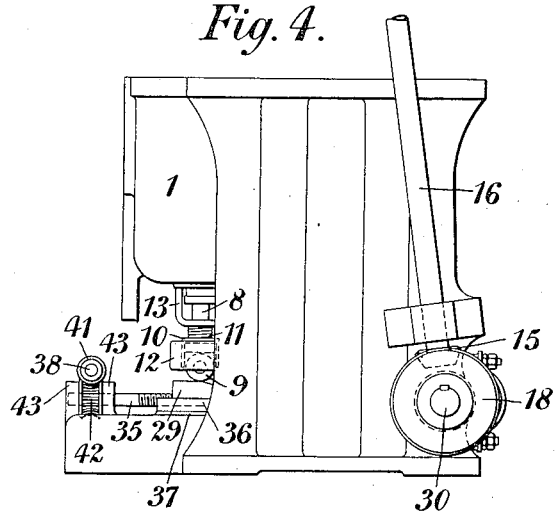

Figure 1 is a side elevation, Fig. 2 a front elevation, and Fig. 3 (drawn to a larger scale) a transverse section, of the lower part of so much of a three-cylinder pump, (such as is usually operated by an electric motor), as is necessary to show the application of this invention thereto. Fig. 4 is a side elevation, Fig. 5 a front elevation, and Fig. 6 (drawn to a larger scale) a transverse section, of a modification. Figs. 7 and 8 are vertical sections showing, respectively, the application of this invention to the delivery valve and to a special valve, all as hereinafter described.

Referring first to the arrangement Figs. 1, 2 and 3. The pump cylinders 1, suction chambers 2, and suction valves and their seatings and the delivery chambers 3, and delivery valves 4, and their seatings 5, and other parts not specially described are, or may be, of the usual, or any suitable, kind. The rods, or spindles, 8 are separate from the valves 6 and are provided to keep them open, as may be required, for adjustment of the delivery of the pump. The outer ends of the said rods, or spindles, are preferably provided with rollers 9, and with bush pieces 10, slidable in brackets 12, the said rods, or spindles, being pressed down by springs 11 each bearing on the bush-piece 10 and on brackets 13. The crank-shaft of the pump synchronously rotates the cam-shaft 20, through the bevel wheel 17, pinion 14, shaft 16 and pinion 15 and bevel wheel 18, the said wheel 18 being on a sleeve 19 loose on the shaft 20, and the said wheel 18 carrying with it a disk 21, furnished with brackets 22, in which is mounted a worm-shaft 24 carrying a worm 23 engaging with a worm-wheel 25 fixed to the end of the shaft 20, on which shaft are fixed the cams 26, the elevations 27 of which cams are for keeping the suction valves open when desired as aforesaid. The bevel-wheel 18, and disk 21, are normally prevented from turning on the cam-shaft 20 by the worm 23 engaging with the worm-wheel 25, but by turning the worm 23, by means of the hand-wheel 28, on the worm-shaft 24, the angular position of the bevel-wheel 18 and disk 21 is altered and the relation of the elevated parts 27 of the cams 26 to the stroke of the plunger is thus adjusted.

Figure 5:
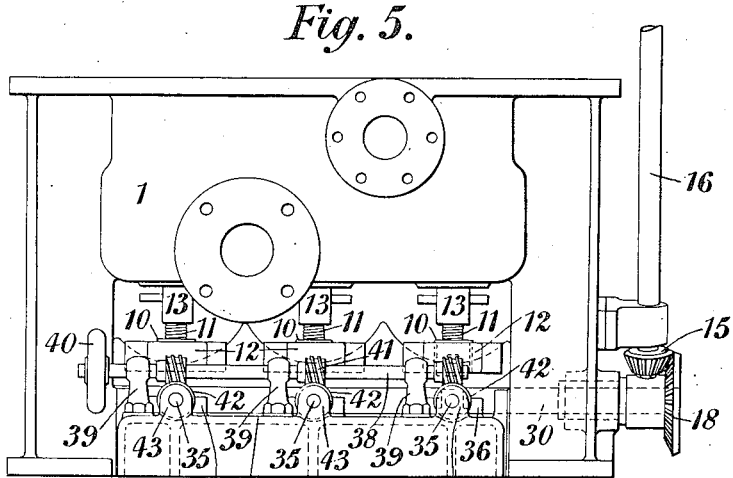
Figure 6:
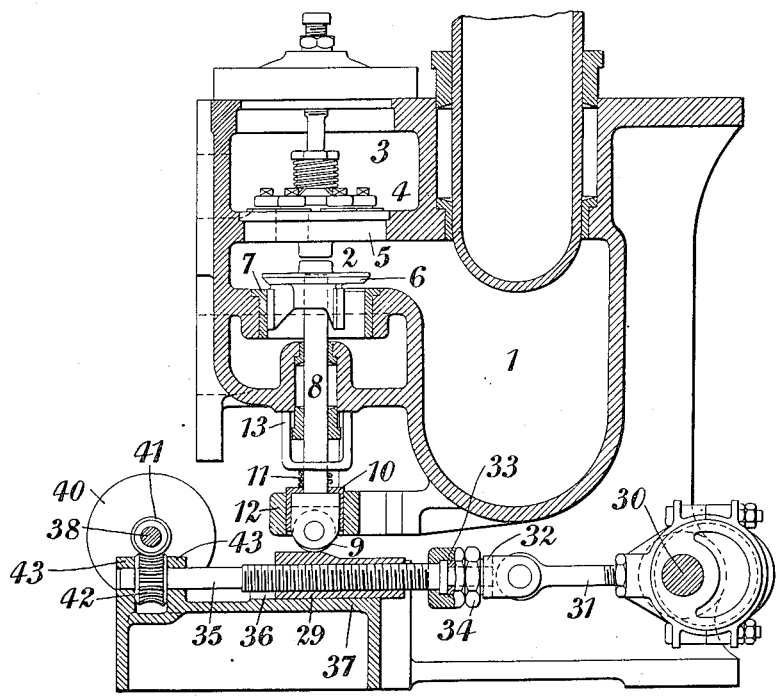

In the arrangement Figs. 4, 5 and 6, the action on the suction valve is similar to that explained with regard to Figs. 1, 2 and 3, and corresponding parts are marked with the same reference numerals, but sliding blocks are used, instead of cams, to keep open the suction valves as required for regulation. The eccentric shaft 30 is driven by bevel gear and an intermediate shaft, as used in the arrangement Figs. 1, 2 and 3, for operating the cam-shaft. The straps of the eccentrics carried by the shaft 30 are connected, through rods 31 and links 32 and a rotatable joint, (secured by nuts 33 and 34), with the screwed rods 35, so as to reciprocate the said rods and the blocks 29 supported and guided between guides 36 on the bed plate 37. By rotating the rods 35 in one direction, each sliding block is screwed along its rod 35, until only the lower faces of the said blocks come into contact with the rollers 9 during the reciprocating movement of the said blocks produced by the eccentrics. The suction valve is then free to close during the whole of the discharge stroke of the pump as the rods, or spindles, 8 are not held open by the said blocks 29. By rotating the screwed rods 35 in the opposite direction, the sliding blocks 29 are screwed along the said rods 35, until the elevated parts of the said blocks 29 are in contact with the rollers 9, for a greater, or lesser, amount of the delivery stroke. If they be in such contact during the full extent of such stroke, the suction valve is kept open during the whole of the delivery stroke of the plungers and then no fluid is discharged, and by adjusting the said blocks 29 to any intermediate position between the extreme positions varying proportions of the maximum delivery of the pump can be obtained by keeping the suction valve open during any desired portion of the delivery stroke of the plungers.

If each eccentric be in the position shown in Fig. 6 when the plunger is at the top of its stroke, the elevated part of the sliding blocks 29 will come beneath the rollers 9, equally during the latter part of the suction stroke and the earlier part of the discharge stroke. The suction valves are always raised by the vacuum produced in the cylinders at the commencement of the suction stroke of the plungers, and unless the blocks 29 be in the first extreme position before mentioned, the said blocks 29 will retain the suction valves in their open position during a portion of the discharge stroke of the plungers corresponding to the extent of the elevated portion of the sliding blocks 29 which has to pass beneath the rollers 9 during each such stroke. The screwed rods 35 are rotated for the purpose of adjusting the position upon them of the blocks 29 by turning the hand-wheel 40 fixed on the worm-shaft 38, which is supported in standards 39, and carries worms 41, engaging with worm-wheels 42 fitted by a groove and feather attachment to the said screwed rods 35, so as to allow of the sliding of the said screwed rods and their blocks 29, the worm wheels 42 being held between the horns 43.

If the shaft 20 which carries the cams in the arrangement Figs. 1, 2 and 3, or the shaft 30 which carries the eccentrics in the arrangement Figs. 4, 5 and 6, be geared to rotate once for each revolution of the crank-shaft of the pump, then, if the passage of the elevated parts of the cams 26, or of the sliding blocks 29, beneath the rods, or spindles, 8, be made to coincide with the whole of the discharge stroke of the pump, no fluid will be forced through the discharge valve as the fluid will return into the suction chamber and piping and, as the said elevated parts are adjusted in one direction, or the other, they will keep the suction valves open during the latter part, or the earlier part, of the discharge stroke to an extent in accordance with their adjustment.

If desired, in the arrangement Figs. 4, 5 and 6, the eccentric shaft 30 may be driven through a train of gear and its angularity and that of the eccentrics relatively to the crank-shaft of the pump be varied in a measure similar to that described for the cam-shaft with reference to Figs. 1, 2 and 3 and then the sliding blocks 29 will not require to be adjustable on the screwed rods 35.

Fig. 7 is a vertical section through a valve-casing of a pump-cylinder in which the discharge valves, instead of the suction valves, are held open for effecting the regulation. This is effected by means of a vertical spindle 8 with a box-end 8* operated by a cam 26 on the cam shaft 20 driven from the crank-shaft of the pump as in the former case. The spindle 8 has in it a slotted hole 44, through which passes a pin 45, fixed in the hollow stem 46 of the delivery valve 4. By this means the delivery valve 4 will be opened by the pressure of discharge fluid, while the elevation 27, on the cam 26, keeps the spindle 8 in its lowest position, as shown in the drawing, as then the slotted hole 44 allows the pin 45 to rise in it. The spring 47 is for insuring the proper closing of the delivery valve. By causing the elevation 27 on the cam 26 to act upon the upper member of the box-end 8* through the whole, or any desired portion, of the suction stroke of the plungers of the pump, the valve 4 is held open for a corresponding period, as the lower part of the slot 44 prevents the pin 45 from descending and, consequently, the discharge valve from closing during that period.

Fig. 8 is a vertical section through the valve casing of a cylinder of a pump showing how special valves can be used in place of operating on the suction, or discharge, valves themselves. The by-pass valve 48 is seated around an opening giving communication between the cylinder of the pump and the suction chamber 2. This valve 48 is shown as being manipulated, for regulation, by an arrangement of gear like that shown in Figs. 1, 2 and 3, although the arrangement shown in Figs. 4, 5 and 6, or any other suitable arrangement, may be used. If desired, the valve 48 can be arranged to control a by-pass between the delivery chamber 3 and the pump cylinder, and then, when less than the maximum discharge of the pump is required, this valve would be held open during the whole, or any required portion, of the suction stroke of the plungers.

I have marked the parts in Figs. 7 and 8, which correspond with those shown in the other figures, with the same reference numerals and they will be understood from the preceding description.

Having now particularly described and ascertained the nature of the said invention and in what manner the same is to be performed, I declare that what I claim is:—

1. A multiple cylinder pump having a number of cylinders and plungers and coöperating valves therefor, a part having cam surfaces and means for operating said part whereby said valves may be opened and held open during any required portion of the stroke of the plungers so as to render all the plungers similarly ineffective for delivery, substantially as described.

2. A multiple cylinder pump having a number of cylinders and plungers and coöperating valves therefor, a part having cam surfaces and means, in combination with the crank shaft of the plungers, for operating said part whereby said valves may be opened and held open during any required portion of the stroke of the plungers so as to render all the plungers similarly ineffective for delivery, substantially as described.

3. A multiple cylinder pump having a number of cylinders and plungers and coöperating valves therefor, a cam shaft, and means in connection with the crank shaft of the plungers for operating said cam shaft and means in connection with said cam shaft whereby said valves may be opened and held open during any required portion of the stroke of the plungers so as to render all the plungers similarly ineffective for delivery, substantially as described.

In testimony whereof I have signed this specification in the presence of two subscribing witnesses.

T. H. C. HOMERSHAM.

Witnesses:
ARTHUR D. ELLIS,
A. W. POSTLETHWAITE.